United States Patent
Eickmann et al.

(10) Patent No.: US 8,403,347 B2
(45) Date of Patent: Mar. 26, 2013

(54) FRONT-AXLE BRACKET, IN PARTICULAR FOR MOTOR VEHICLES

(75) Inventors: Juergen Eickmann, Schellerten (DE); Uwe Lange, Wernigerode (DE)

(73) Assignee: KSM Castings Group GmbH, Hildesheim (DE)

( * ) Notice: Subject to any disclaimer, the term of this patent is extended or adjusted under 35 U.S.C. 154(b) by 0 days.

(21) Appl. No.: 11/989,903

(22) PCT Filed: Sep. 8, 2006

(86) PCT No.: PCT/DE2006/001582
§ 371 (c)(1),
(2), (4) Date: Feb. 1, 2008

(87) PCT Pub. No.: WO2007/031060
PCT Pub. Date: Mar. 22, 2007

(65) Prior Publication Data
US 2009/0051154 A1    Feb. 26, 2009

(30) Foreign Application Priority Data
Sep. 13, 2005 (DE) .......................... 10 2005 043 759

(51) Int. Cl.
*B62D 21/00* (2006.01)
(52) U.S. Cl. ................... 280/124.109; 280/788; 180/312
(58) Field of Classification Search .................. 180/312; 280/124.109, 788
See application file for complete search history.

(56) References Cited

U.S. PATENT DOCUMENTS

| | | | | |
|---|---|---|---|---|
| 3,729,210 A | * | 4/1973 | Cunningham, Jr. | 280/124.109 |
| 3,834,476 A | * | 9/1974 | Donaldson | 180/312 |

(Continued)

FOREIGN PATENT DOCUMENTS

| | | |
|---|---|---|
| DE | 199 20 051 A1 | 11/2000 |
| DE | 101 42 388 | 5/2002 |

(Continued)

OTHER PUBLICATIONS

Maeno et al., Power Unit rear Mount Structure for Vehicle, Oct. 22, 1996, JPO, JP 08-276753 A, English Abstract.*

(Continued)

*Primary Examiner* — Joseph Rocca
*Assistant Examiner* — James English
(74) *Attorney, Agent, or Firm* — Collard & Roe, P.C.

(57) ABSTRACT

Front-axle bracket (1) for motor vehicles, in which in each case two receptacles or recesses (5, 6) for the bearings for the swivel mounting of in each case one of two wheel control elements (7), such as the wishbone or A-arm, and the receptacles (18, 19, 20) for the securing of the front-axle bracket are provided as a premanufactured unit together with preassembled assemblies on the vehicle body, and at least some of the receptacles or recesses listed below for the securing of the steering mechanism (13) the securing of the stabilizer (15) the mounting of a hinged column (14), and the front-axle bracket is produced in the form of a light-metal component which is integral with said receptacles or recesses and connects them to one another.

72 Claims, 2 Drawing Sheets

U.S. PATENT DOCUMENTS

| | | | |
|---|---|---|---|
| 4,723,791 A * | 2/1988 | Miura et al. | 280/124.109 |
| 5,833,026 A | 11/1998 | Zetterström et al. | |
| 5,918,893 A | 7/1999 | Marquardt et al. | |
| 6,409,216 B2 * | 6/2002 | Suzuki | 280/781 |
| 6,511,096 B1 * | 1/2003 | Kunert et al. | 280/785 |
| 6,516,913 B1 * | 2/2003 | Hartel et al. | 180/312 |
| 6,648,351 B1 * | 11/2003 | Kosak | 280/124.109 |
| 6,979,023 B2 * | 12/2005 | Mikasa et al. | 280/781 |
| 7,111,705 B2 * | 9/2006 | Ohta et al. | 180/312 |
| 2002/0050706 A1 * | 5/2002 | Mikasa et al. | 280/788 |
| 2002/0113394 A1 * | 8/2002 | Ziech et al. | 280/124.109 |
| 2002/0166711 A1 * | 11/2002 | Witherspoon et al. | 180/291 |
| 2005/0116459 A1 * | 6/2005 | Ito et al. | 280/781 |
| 2010/0289240 A1 * | 11/2010 | Buschjohann et al. | 280/124.1 |

FOREIGN PATENT DOCUMENTS

| | | |
|---|---|---|
| EP | 2 615 458 | 5/1987 |
| EP | 0 779 204 B1 | 6/1997 |
| EP | 0 816 139 | 1/1998 |
| EP | 1 247 678 | 7/2002 |
| EP | 1 504 983 B1 | 2/2005 |
| JP | 04-368288 | 12/1992 |
| JP | 08-198134 | 8/1996 |
| JP | 08276753 A * | 10/1996 |
| JP | 10-138946 | 5/1998 |
| JP | 10-258763 | 9/1998 |
| JP | 2000-108688 | 4/2000 |
| JP | 2001-191945 | 7/2001 |
| JP | 2002-137758 | 5/2002 |
| JP | 2005-178556 | 7/2005 |
| WO | WO 90/05083 | 5/1990 |

OTHER PUBLICATIONS

Maeno et al., Power Unit rear Mount Structure for Vehicle, Oct. 22, 1996, JPO, JP 08-276753 A, Machine Translation of Description.*
International Search Report.
Internet printout "Partscatalog.Ru" dated Feb. 2, 2010 showing Prior Art Front-axle Bracket used in the Vehicle of the C class of Daimler AG—Part No. A 2036280657 (No. 100).
ATZ "Fahrwerksteile aus Aluminiumguss" ATZ, März 2005, pp. 194-197 (EP Opposition).
ATZ extra, "Der neue Golf" ATZ, Oktober 2003, pp. 74-89, 104 (EP Opposition).
Volkswagen AG "Service Training—Selbststudienprogramm 321—der Golf 2004—Fahrwerk", Wolfsburg: Volkswagen AG, 2003, pp. 6-10 (EP Opposition).
ATZ "Einteilig gegossenen Aluminum-Achsträger & Leichtbau mit Eisenwerkstoffen", ATZ, Februar 2005, pp. 118-131 (EP Opposition).

* cited by examiner

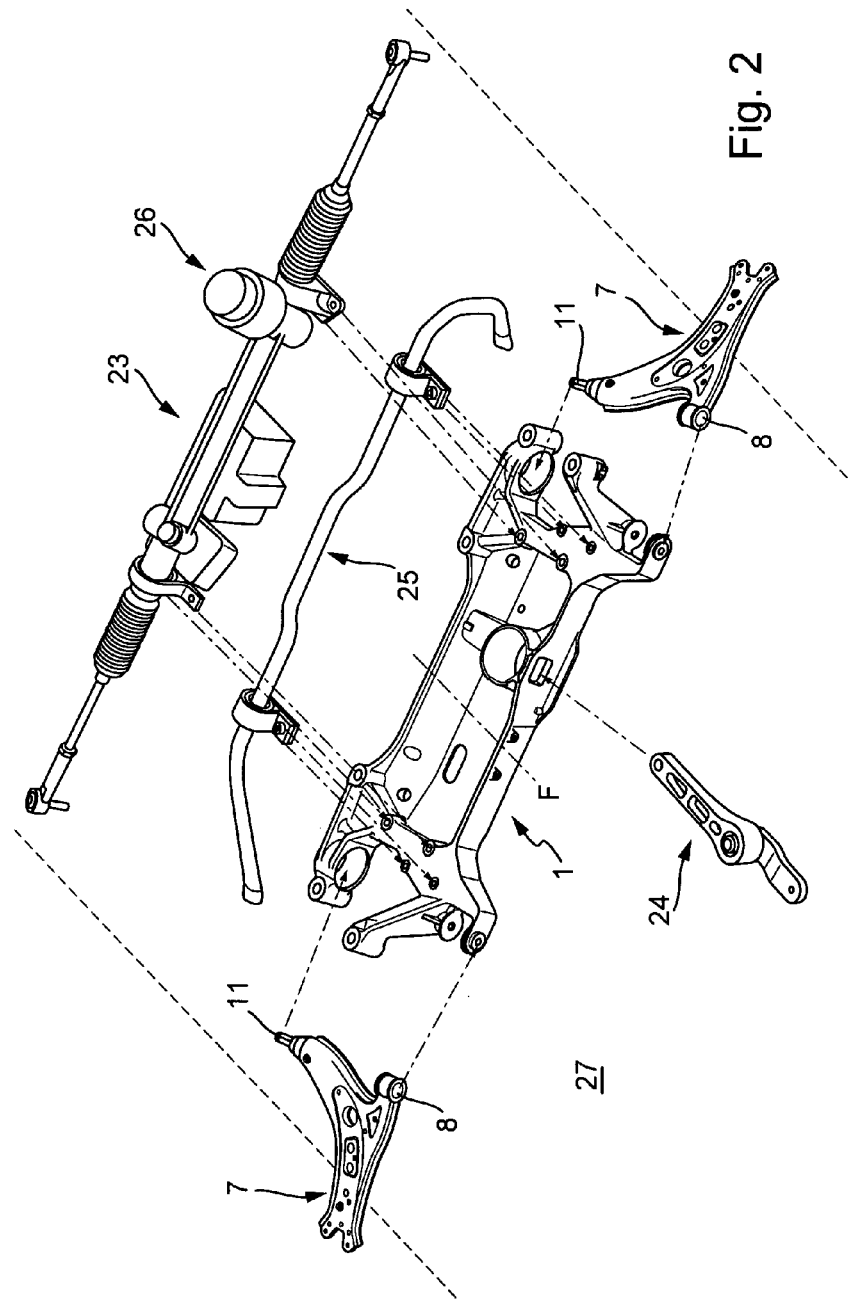

RONT-AXLE BRACKET, IN PARTICULAR FOR MOTOR VEHICLES

CROSS REFERENCE TO RELATED APPLICATIONS

Applicants claim priority under 35 U.S.C. §119 of German Application No. 10 2005 043 759.1 filed Sep. 13, 2005. Applicants also claim priority under 35 U.S.C. §365 of PCT/DE2006/001582 filed Sep. 8, 2006. The international application under PCT article 21(2) was not published in English.

BACKGROUND OF THE INVENTION

1. Field of the Invention

The invention relates to a front axle bracket for motor vehicles. Such brackets, also referred to as subframes, frames or auxiliary frames, are mounted after they are provided with assemblies and/or auxiliary assemblies, as preassembled units or modules on vehicle bodies, for example, on the body and/or on the longitudinal beam of a motor vehicles.

2. Description of the Related Art

Such a subframe or front-axle bracket in which in each case two receptacles for the bearing for the swivel mounting of in each case one of the two wheel control elements, such as the wishbone or A-arm, are provided and further receptacles or recesses for the securing of the steering mechanism, the stabilizer and other assemblies and wherein the subframe in addition has other receptacles or recesses for the securing thereof as premanufactured unit together with preassembled assemblies on the vehicle body, has become known through DE 199 20 051 A1.

Such subframes have the disadvantage that they are very complex in the production because, first of all, different profiles have to be manufactured for the longitudinal beams as well as for the cross beams (also internal pressure-defected), furthermore, the receptacles for the different assemblies as well as the receptacles for the subframe have to be individually mounted to the chassis, for example, screwed on or welded and individual receptacles, for example, at the end of the side members, have to be reshaped, for example, flattened.

SUMMARY OF THE INVENTION

The object of the present invention was based on the object to avoid the disadvantages of the previously known brackets, respectively, frames or subframes and to simplify the production of these and to design them more cost-efficiently, to reduce the number of components and therewith to reduce the joining and assembly process, to improve handling, to reduce weight on the vehicle itself and on the frame and, thus, to save transportation costs and also to reduce the unsuspended mass. Furthermore, the assembly of the assemblies to a pre-assembled unit should be facilitated and become more cost-efficient as well as the assembly of the preassembled unit in the motor vehicle.

In accordance with the invention this is achieved in that at a front-axle bracket at least in each case two receptacles or recesses for the bearing for the swivel mounting of, in each case, one of two wheel control elements, such as two wishbone and/or A-arms and the receptacles or recesses for the securing of the front-axle bracket as a premanufactured unit together with preassembled assemblies on the vehicle body, has as well as at least some of the receptacles or recesses listed below for the securing of the steering mechanism
the securing the stabilizer
the bearing of a swivel mounting and wherein the front-axle bracket is produced in the form of a light-metal component which is integral with the receptacle and connects them to one another.

It can be advantageous if aluminium or an aluminium alloy is used as light-metal. Furthermore, it can be advantageous to produce the component, that is, the front-axle bracket, in a cast aluminium method such as in the tilting permanent mold casting process.

Such a front-axle bracket or subframe is significantly more cost-effective to produce compared to the previously known bracket because the joining together of single parts forming the frame and the securing of the receptacles is eliminated, therefore, joining and assembly processes are reduced. Surprisingly, a considerable savings in weight is also possible through the invention due to the higher specific weight of aluminium compared to its effective substances. Thus, not only weight in the vehicle itself can be saved vehicle and therefore fuel but transport costs can be saved in addition and the suspended mass reduced.

The front-axle bracket according to the invention, furthermore, can have an almost continuous base body except for the recesses for the receptacles and other recesses, e.g. for assembly purposes which expediently can be surrounded by reinforcement fins and the receptacles for the bearing of the wheel control members can be formed as arms. Thereby it is expedient if one of the two receptacles for each of the wheel control elements is formed such that this receptacle has at least two receptacle elements, spaced at least approximately in the longitudinal direction of the vehicle, for the encompassing U-shaped mounting of the one bearing at the wheel control element and wherein the second of the receptacles for the bearing of each of the wheel control elements, as seen in the longitudinal direction of the vehicle, is spaced from the receptacle elements and wherein the second receptacle serves for the bearing of the other one formed as a journal of the wheel control element, wherein the bearing Journal of the wheel control element can run at least approximately in the longitudinal direction of the vehicle.

It can be especially advantageous on the arm comprising the second support integral therewith to provide a first receptacle or recess for the securing means to secure the bracket on the vehicle body, wherein it can be expedient when this receptacle is provided on the side turned away from the base body of this second receptacle.

According to a further design of the invention, the arm having the second receptacle has two reinforcing fins extending from the second receptacle surrounding the arm and merging in the base body. Thereby it can be expedient when the one reinforcing fin runs on the side turned away from the first receptacle of the arm bearing the second receptacle arm and merges into the base body. The other reinforcing fin on the side turned away from the first support of the arm bearing the second receptacle can expediently merge into the region of a second receptacle for the securing means for the securing of the bracket at the vehicle body.

Optimal structural strength values can be realized by such a design with a minimum deployment of material.

The arm bearing the second receptacle and extending from the base body suitably has a double-T cross-section.

It can be further advantageous when the arm between the second receptacle for the other bearing and the second receptacle or recess for securing means for the securing of the bracket on the chassis has a further reinforcing fin running at least approximately transverse to the arm.

Optimal structural strength values can be realized by such a design with a minimum deployment of material.

BRIEF DESCRIPTION OF THE DRAWINGS

The invention is explained in more detail on the basis of the exemplary embodiment shown in the drawing.

FIG. 2 shows the embodiment of FIG. 1 with the respective assemblies schematically shown in exploded view.

DETAILED DESCRIPTION OF PREFERRED EMBODIMENTS

Figure 1:
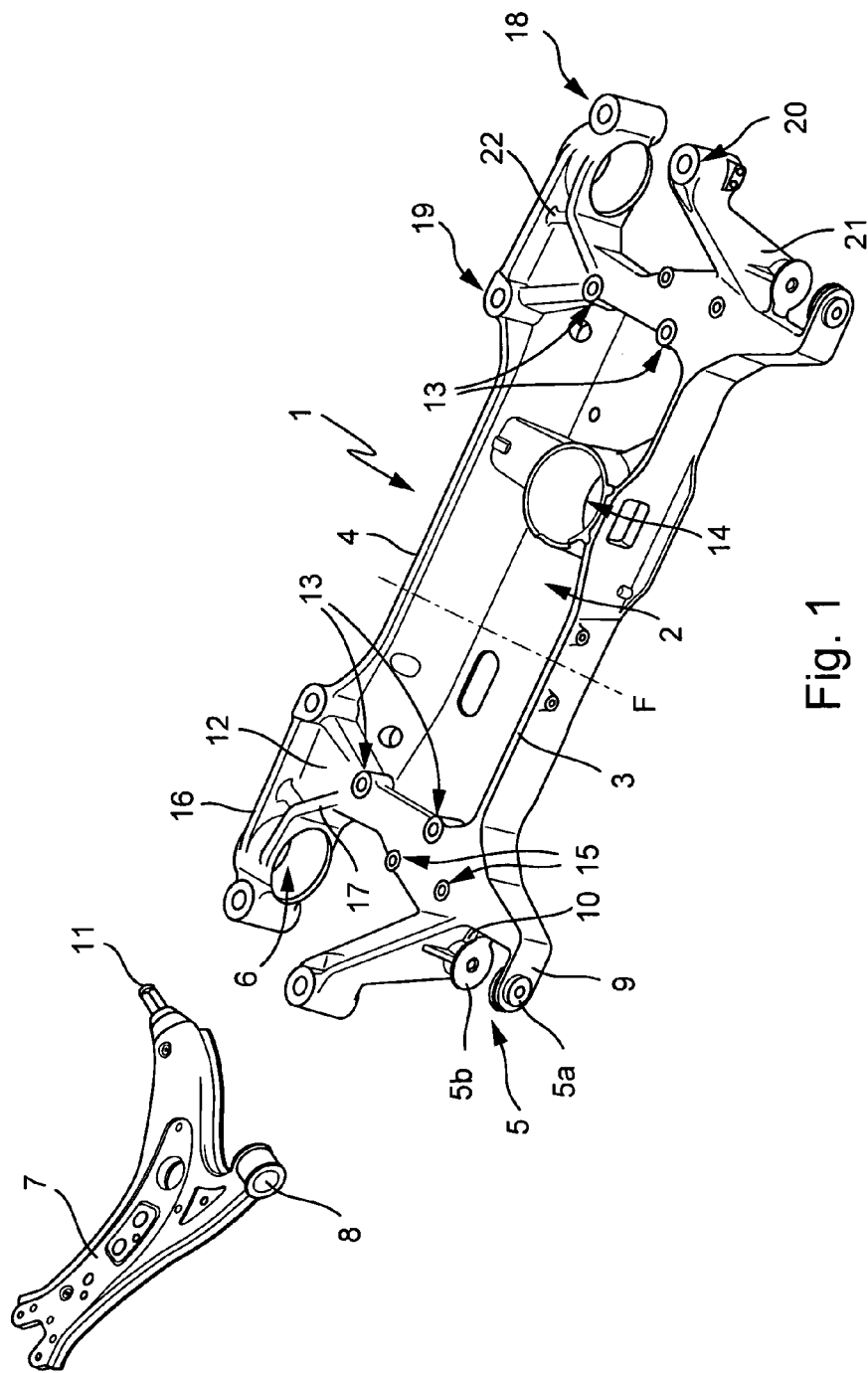
FIG. 1 shows an embodiment of a front axle bracket for motor vehicles in accordance with the invention.

The front-axle bracket 1 here has a base 2 which is surrounded by reinforcing ribs 3, 4. It has, further, bearing receptacles 5, 6 on both sides of the longitudinal vehicle axis F for the bearing of a wheel control element, respectively, wishbone or A-arm 7 on each side of the vehicle axis F. Thereby the receptacle 5 for the one bearing 8 of the wishbone 7 is formed by two arm receptacle elements 5a, 5b, which are provided in one arm each 9, 10 which extends from the base body 1.

The second bearing receptacle 6 for the second bearing 11 on the wishbone 7 is also provided on an arm 12. The front-axle bracket 1 has furthermore receptacles or recesses 13 for the securing of a steering gear 23 or steering mechanism 26 schematically shown in FIG. 2.

Further, a receptacle 14 is provided in the bracket 1 for the mounting of the pendulum support 24 (schematically shown in FIG. 2) and receptacles or recesses 15 are provided for the securing of the stabilizer 25 (schematically shown in FIG. 2). Receptacle 14 is formed predominantly as a cylindrical sleeve or jacket-like and directed predominantly towards road 27.

Arms 12 are surrounded by reinforcing fins 16, 17, which extending from the base body terminate in the bearing receptacle 6.

The bracket has further on both sides of the longitudinal axis of the vehicle F in each case first, second and third receptacles or recesses provided for securing means for mounting the bracket on the vehicle body, namely, receptacles or recesses 18, 19, 20. The first receptacle or recess 18 for securing means for securing the bracket on the vehicle body is provided on arm 12, namely, on the side of the receptacle 6 turned away from the base body.

The respective fin 16 merges directly into the second receptacle for the securing means for the securing of the bracket on the vehicle body.

The third receptacle 20 is provided at an arm 21 which extends from arm 10 which also includes the reception member 5b of the first bearing receptacle 5.

The arm 12 with its two reinforcing ribs fins 16 and 17 has a double-T-shaped cross-section and has, further, on the side turned away from the receptacle 18 of the second bearing receptacle 6 a reinforcing fin 22 running at least approximately

The invention claimed is:

1. A front-axle bracket for a motor vehicle having a vehicle body, said front-axle bracket comprising two bearing receptacles or recesses for bearings for a swivel mounting of in each case one of two wheel control elements and securing means receptacles for securing means for securing of the front-axle bracket and provided as a premanufactured unit together with pre-assemblable assemblies on the vehicle body, and steering mechanism receptacles or recesses for the securing of a steering mechanism, stabilizer receptacles or recesses for the securing of a stabilizer, and a single pendulum support receptacle or recess for the mounting of a pendulum support, and the front-axle bracket comprises a light-metal component which is cast in one piece with said bearing receptacles or recesses, said securing means receptacles, said steering mechanism receptacles or recesses, said stabilizer receptacles or recesses, and said single pendulum support receptacle or recess, wherein the front-axle bracket connects said bearing receptacles or recesses, said securing means receptacles, said steering mechanism receptacles or recesses, said stabilizer receptacles or recesses, and said single pendulum support receptacle or recess to one another; and wherein the single pendulum support receptacle or recess is primarily formed as a cylindrical sleeve and directed predominantly towards a road.

2. The front-axle bracket according to claim 1, wherein said light-metal component comprises an aluminum alloy.

3. The front-axle bracket according to claim 1, wherein said light-metal component is produced in an aluminum casting process.

4. The front-axle bracket according to claim 1, wherein said bracket has a continuous base body, except for the bearing receptacles or recesses, the securing means receptacles, the steering mechanism receptacles or recesses, said stabilizer receptacles or recesses, and said single pendulum support receptacle or recess, said base body being surrounded by reinforcing fins and the bearing receptacles or recesses for the bearing of the wheel control elements being provided on arms.

5. The front-axle bracket according to claim 1, wherein the two bearing receptacles or recesses comprise a first bearing receptacle and a second bearing receptacle, wherein the first bearing receptacle is for a first bearing location and has two receptacle elements spaced at least approximately in the longitudinal direction of the vehicle for the encompassing U-shaped mounting of the first bearing location and wherein the second bearing receptacle is spaced in the longitudinal vehicle direction from the receptacle elements of the first bearing receptacle, wherein the second bearing receptacle serves for a second bearing location and is formed as a journal of the wheel control element.

6. The front-axle bracket according to claim 1, further comprising a base body and first and second arms, wherein the two bearing receptacles or recesses comprise a first bearing receptacle and a second bearing receptacle, wherein the securing means receptacles comprise a first securing means receptacle and a second securing means receptacle, wherein the bearing receptacles are provided on the arms, wherein the first arm has the second bearing receptacle and the first securing means receptacle.

7. The front-axle bracket according to claim 6, wherein said first securing means receptacle is provided on the side turned away from said base body of said second bearing receptacle.

8. The front-axle bracket according to claim 6, wherein said first arm comprises first and second reinforcing fins extending from said second bearing receptacle surrounding said first arm and merging into said base body.

9. The front-axle bracket according to claim 8, wherein said first reinforcing fin extends on the side turned towards said first bearing receptacle of said first arm and merges into said base body.

10. The front-axle bracket according to claim 8, wherein said second reinforcing fin on the side turned away from said first bearing receptacle of said first arm in the region of the second securing means receptacle merges into said base body.

11. The front-axle bracket according to claim 6, wherein said first arm extending from said base body has a double-T-cross section.

12. The front-axle bracket according to claim 11, wherein said first arm between said second bearing receptacle and said second securing means receptacle has a reinforcing fin extending at least approximately transverse to said first arm.

13. The front-axle bracket according to claim 1, wherein each wheel control element is a suspension arm.

14. The front-axle bracket according to claim 1, wherein each wheel control element is an A-arm.

15. The front-axle bracket according to claim 3, wherein the aluminum casting process is a tilting mold casting process.

16. The front-axle bracket according to claim 4 wherein the base body has additional recesses.

17. The front-axle bracket according to claim 16, wherein the additional recesses are assembly recesses.

18. A front-axle bracket for a motor vehicle having a vehicle body, in which two bearing location receptacles or recesses for bearing locations are provided, in each instance, for pivoting mounting of each of two wheel control elements, and securing means receptacles for securing means for securing the front-axle bracket on the vehicle body, as a pre-finished unit, along with pre-assemblable elements, are provided, along with
  steering gear securing receptacles or recesses for securing of a steering gear,
  a single pendulum support receptacle or recess for mounting of a pendulum support,
  and the front-axle bracket is produced as a one-piece component made of light metal cast in one piece with the bearing location receptacles or recesses, the securing means receptacles, the steering gear securing receptacles or recesses, and the single pendulum support receptacle or recess,
  wherein the front-axle bracket connects the bearing location receptacles or recesses, the securing means receptacles, the steering gear securing receptacles or recesses, and the single pendulum support receptacle or recess with one another; and
  wherein the single pendulum support receptacle or recess is primarily formed as a cylindrical sleeve and directed predominantly towards a road.

19. A front-axle bracket for a motor vehicle having a vehicle body, in which two bearing location receptacles or recesses for bearing locations are provided, in each instance, for pivoting mounting of each of two wheel control elements, and securing means receptacles for securing means for securing the front-axle bracket on the vehicle body, as a pre-finished unit, along with pre-assemblable elements, are provided, along with
  stabilizer securing receptacles or recesses for securing of a stabilizer, and
  a single pendulum support receptacle or recess for mounting of a pendulum support,
  and the front-axle bracket is produced as a one-piece component made of light metal cast in one piece with the bearing location receptacles or recesses, the securing means receptacles, the stabilizer securing receptacles or recesses, and the single pendulum support receptacle or recess,
  wherein the one-piece component connects the bearing location receptacles or recesses, the securing means receptacles, the stabilizer securing receptacles or recesses, and the single pendulum support receptacle or recess with one another; and
  wherein the single pendulum support receptacle or recess is primarily formed as a cylindrical sleeve and directed predominantly towards a road.

20. The front-axle bracket according to claim 18, wherein said light-metal component comprises an aluminum alloy.

21. The front-axle bracket according to claim 18, wherein said light-metal component is produced in an aluminum casting process.

22. The front-axle bracket according to claim 18, wherein said bracket has a continuous base body, except for the bearing receptacles or recesses, the securing means receptacles, the steering gear securing receptacles or recesses, and said single pendulum support receptacle or recess, said base body being surrounded by reinforcing fins and the bearing receptacles or recesses for the bearing of the wheel control elements being provided on arms.

23. The front-axle bracket according to claim 18, wherein the two bearing receptacles or recesses comprise a first bearing receptacle and a second bearing receptacle, wherein the first bearing receptacle is for a first bearing location and has two receptacle elements spaced at least approximately in the longitudinal direction of the vehicle for the encompassing U-shaped mounting of the first bearing location and wherein the second bearing receptacle is spaced in the longitudinal vehicle direction from the receptacle elements of the first bearing receptacle, wherein the second bearing receptacle serves for a second bearing location and is formed as a journal of the wheel control element.

24. The front-axle bracket according to claim 18, further comprising a base body and first and second arms, wherein the two bearing receptacles or recesses comprise a first bearing receptacle and a second bearing receptacle, wherein the securing means receptacles comprise a first securing means receptacle and a second securing means receptacle, wherein the bearing receptacles are provided on the arms, wherein the first arm has the second bearing receptacle and the first securing means receptacle.

25. The front-axle bracket according to claim 24, wherein said first securing means receptacle is provided on the side turned away from said base body of said second bearing receptacle.

26. The front-axle bracket according to claim 24, wherein said first arm comprises first and second reinforcing fins extending from said second bearing receptacle surrounding said first arm and merging into said base body.

27. The front-axle bracket according to claim 26, wherein said first reinforcing fin extends on the side turned towards said first bearing receptacle of said first arm and merges into said base body.

28. The front-axle bracket according to claim 26, wherein said second reinforcing fin on the side turned away from said first bearing receptacle of said first arm in the region of the second securing means receptacle merges into said base body.

29. The front-axle bracket according to claim 24, wherein said first arm extending from said base body has a double-T-cross section.

30. The front-axle bracket according to claim 29, wherein said first arm between said second bearing receptacle and said second securing means receptacle has a reinforcing fin extending at least approximately transverse to said first arm.

31. The front-axle bracket according to claim 18, wherein each wheel control element is a suspension arm.

32. The front-axle bracket according to claim 18, wherein each wheel control element is an A-arm.

33. The front-axle bracket according to claim 21, wherein the aluminum casting process is a tilting mold casting process.

34. The front-axle bracket according to claim 22 wherein the base body has additional recesses.

35. The front-axle bracket according to claim 34, wherein the additional recesses are assembly recesses.

36. The front-axle bracket according to claim 19, wherein said light-metal component comprises an aluminum alloy.

37. The front-axle bracket according to claim 19, wherein said light-metal component is produced in an aluminum casting process.

38. The front-axle bracket according to claim 19, wherein said bracket has a continuous base body, except for the bearing receptacles or recesses, the securing means receptacles, the stabilizer securing receptacles or recesses, and said single pendulum support receptacle or recess, said base body being surrounded by reinforcing fins and the bearing receptacles or recesses for the bearing of the wheel control elements being provided on arms.

39. The front-axle bracket according to claim 19, wherein the two bearing receptacles or recesses comprise a first bearing receptacle and a second bearing receptacle, wherein the first bearing receptacle is for a first bearing location and has two receptacle elements spaced at least approximately in the longitudinal direction of the vehicle for the encompassing U-shaped mounting of the first bearing location and wherein the second bearing receptacle is spaced in the longitudinal vehicle direction from the receptacle elements of the first bearing receptacle, wherein the second bearing receptacle serves for a second bearing location and is formed as a journal of the wheel control element.

40. The front-axle bracket according to claim 19, further comprising a base body and first and second arms, wherein the two bearing receptacles or recesses comprise a first bearing receptacle and a second bearing receptacle, wherein the securing means receptacles comprise a first securing means receptacle and a second securing means receptacle, wherein the bearing receptacles are provided on the arms, wherein the first arm has the second bearing receptacle and the first securing means receptacle.

41. The front-axle bracket according to claim 40, wherein said first securing means receptacle is provided on the side turned away from said base body of said second bearing receptacle.

42. The front-axle bracket according to claim 40, wherein said first arm comprises first and second reinforcing fins extending from said second bearing receptacle surrounding said first arm and merging into said base body.

43. The front-axle bracket according to claim 42, wherein said first reinforcing fin extends on the side turned towards said first bearing receptacle of said first arm and merges into said base body.

44. The front-axle bracket according to claim 42, wherein said second reinforcing fin on the side turned away from said first bearing receptacle of said first arm in the region of the second securing means receptacle merges into said base body.

45. The front-axle bracket according to claim 40, wherein said first arm extending from said base body has a double-T-cross section.

46. The front-axle bracket according to claim 45, wherein said first arm between said second bearing receptacle and said second securing means receptacle has a reinforcing fin extending at least approximately transverse to said first arm.

47. The front-axle bracket according to claim 19, wherein each wheel control element is a suspension arm.

48. The front-axle bracket according to claim 19, wherein each wheel control element is an A-arm.

49. The front-axle bracket according to claim 37, wherein the aluminum casting process is a tilting mold casting process.

50. The front-axle bracket according to claim 38 wherein the base body has additional recesses.

51. The front-axle bracket according to claim 50, wherein the additional recesses are assembly recesses.

52. The front-axle bracket according to claim 1, wherein the bearing receptacles or recesses are provided on outwardly-projecting side arms.

53. The front-axle bracket according to claim 1, wherein the securing means receptacles are provided on outwardly-projecting side arms.

54. The front-axle bracket according to claim 1, further comprising side arms connected with a front-axle bracket body by way of reinforcement fins.

55. The front-axle bracket according to claim 1, wherein the bearing receptacles or recesses comprise side arms, wherein the single pendulum support receptacle or recess comprises an accommodation opening formed by an element comprising the sleeve and having an axis pointing at least approximately perpendicular to the road, and wherein said element is provided within the side arms.

56. The front-axle bracket according to claim 1, wherein the two bearing receptacles or recesses comprise a first bearing receptacle or recess and a second bearing receptacle or recess, wherein the first bearing receptacle or recess comprises first and second accommodation elements spaced apart from one another in a longitudinal vehicle direction for holding a first bearing location by surrounding the first bearing location with a U shape, and wherein the second bearing receptacle or recess is spaced apart from the first and second accommodation elements in the longitudinal vehicle direction.

57. The front-axle bracket according to claim 18, wherein the bearing location receptacles or recesses are provided on outwardly-projecting side arms.

58. The front-axle bracket according to claim 18, wherein the securing means receptacles are provided on outwardly-projecting side arms.

59. The front-axle bracket according to claim 18, further comprising side arms connected with a front-axle bracket body by way of reinforcement fins.

60. The front-axle bracket according to claim 18, wherein the bearing location receptacles or recesses comprise side arms, wherein the single pendulum support receptacle or recess comprises an accommodation opening formed by an element comprising the sleeve and having an axis pointing at least approximately perpendicular to the road, and wherein said element is provided within the side arms.

61. The front-axle bracket according to claim 18, wherein the two bearing location receptacles or recesses comprise a first bearing location receptacle or recess and a second bearing location receptacle or recess, wherein the first bearing location receptacle or recess comprises first and second accommodation elements spaced apart from one another in a longitudinal vehicle direction for holding a first bearing location by surrounding the first bearing location with a U shape, and wherein the second bearing location receptacle or recess is spaced apart from the first and second accommodation elements in the longitudinal vehicle direction.

62. The front-axle bracket according to claim 19, wherein the bearing location receptacles or recesses are provided on outwardly-projecting side arms.

63. The front-axle bracket according to claim 19, wherein the securing means receptacles are provided on outwardly-projecting side arms.

64. The front-axle bracket according to claim 19, further comprising side arms connected with a front-axle bracket body by way of reinforcement fins.

65. The front-axle bracket according to claim 19, wherein the bearing location receptacles or recesses comprise side arms, wherein the single pendulum support receptacle or recess comprises an accommodation opening formed by an element comprising the sleeve and having an axis pointing at least approximately perpendicular to the road, and wherein said element is provided within the side arms.

66. The front-axle bracket according to claim 19, wherein the two bearing location receptacles or recesses comprise a first bearing location receptacle or recess and a second bearing location receptacle or recess, wherein the first bearing location receptacle or recess comprises first and second accommodation elements spaced apart from one another in a longitudinal vehicle direction for holding a first bearing location by surrounding the first bearing location with a U shape, and wherein the second bearing location receptacle or recess is spaced apart from the first and second accommodation elements in the longitudinal vehicle direction.

67. A front-axle bracket for a motor vehicle having a vehicle body, which in each case has two bearing receptacles or recesses for bearings for a swivel mounting of in each case one of two wheel control elements and securing means receptacles for securing means for securing of the front-axle bracket on the vehicle body, steering mechanism receptacles or recesses with a steering mechanism fastened thereon, and stabilizer receptacles or recesses with a stabilizer fastened thereon, and is formed as a premanufactured unit together with the steering mechanism and the stabilizer, and a single pendulum support receptacle or recess for the mounting of a pendulum support, said single pendulum support receptacle or recess being primarily formed as a cylindrical sleeve and directed predominantly towards a road, and the front-axle bracket comprises a light-metal component which is cast in one piece with said bearing receptacles or recesses, said securing means receptacles, said steering mechanism receptacles or recesses, said stabilizer receptacles or recesses, and said single pendulum support receptacle or recess, and wherein the front-axle bracket connects said bearing receptacles or recesses, said securing means receptacles, said steering mechanism receptacles or recesses, said stabilizer receptacles or recesses, and said single pendulum support receptacle or recess to one another.

68. The front-axle bracket according to claim 67, wherein the premanufactured unit further comprises wheel control elements with wheel control element bearings stored in the bearing receptacles or recesses, said wheel control element bearings being for swivel mounting of in each case of one of the wheel control elements.

69. The front-axle bracket according to claim 68, wherein the premanufactured unit further comprises the pendulum support stored in the single pendulum support receptacle or recess.

70. The front-axle bracket according to claim 1, wherein one or more of said pre-assemblable assemblies is pre-mounted as an aggregate.

71. The front-axle bracket according to claim 18, wherein one or more of said pre-assemblable elements is pre-mounted as an aggregate.

72. The front-axle bracket according to claim 19, wherein one or more of said pre-assemblable elements is pre-mounted as an aggregate.

\* \* \* \* \*